Sept. 15, 1959      N. F. LEO      2,904,653

RELAYS

Filed Feb. 17, 1955      3 Sheets-Sheet 1

INVENTOR.
NICK F. LEO

BY
Le Roy J. Leishman
AGENT

INVENTOR.
NICK F. LEO
BY LeRoy J. Leishman
AGENT

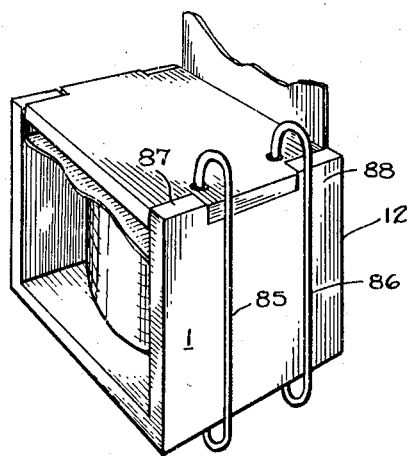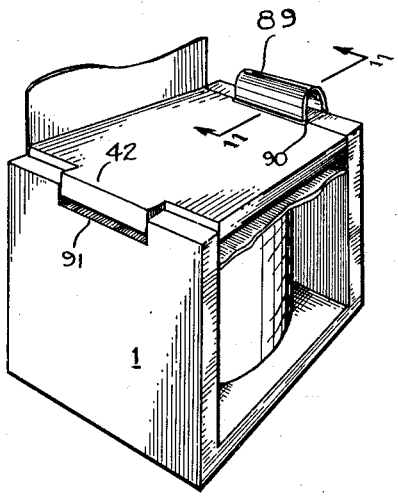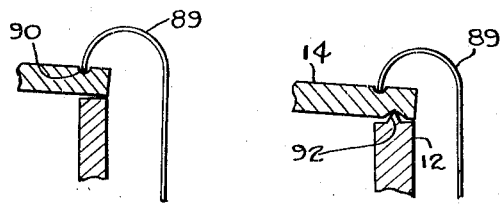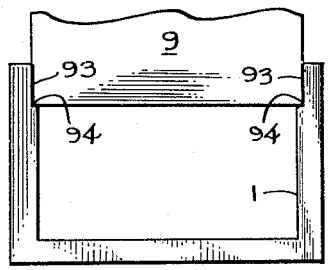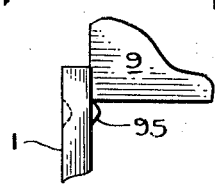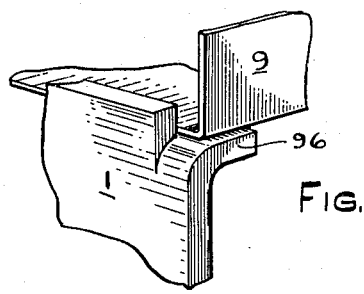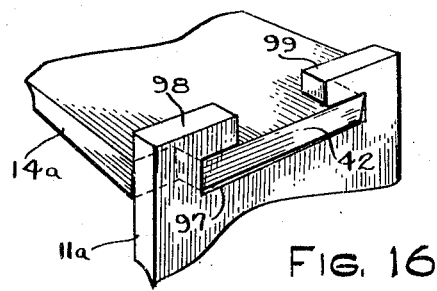

United States Patent Office 2,904,653
Patented Sept. 15, 1959

2,904,653

RELAYS

Nick F. Leo, Van Nuys, Calif.

Application February 17, 1955, Serial No. 488,900

12 Claims. (Cl. 200—87)

The invention herein described pertains to relays and more particularly to midget relays to be actuated by the plate current of a vacuum tube.

The large amount of electronic equipment required in airplanes, and particularly in military aircraft including guided missiles, has made it highly advisable that such electronic equipment be miniature-ized in order to reduce its weight and bulk. The desirability of miniaturization extends to all the components of such equipment, including relays. Sometimes the difference in the size of a relay that will do a given job determines whether or not there is room in a given airplane for the electronic device of which it is a component. It is accordingly an object of the present invention to provide a relay that is smaller than has heretofore been available for performing its intended functions.

In the past, relays that will make and break a circuit of several amperes at more than a few volts, have required vacuum tubes of high capacity in order to produce the energizing current. One object of the present invention is the provision of a relay that will make and break a circuit handling 10 or more amperes at substantially 250 volts alternating current or .5 ampere at 125 volts direct current and which may be actuated by a miniature vacuum tube or semi-conductor device having an output equal to or greater than 2.5 milliamperes at .15 volt D.C.

Relays of conventional construction are limited in the speeds at which they will respond by the resonant periods of their armatures. One object of the present invention is to provide a relay that is not limited by such resonant periods and which is therefore capable of much faster operation than other relays that might respond to impulses of equally low current.

Another object of my invention is to provide a relay of the class described that will make and break a current of the wattage hereinbefore indicated with as little as .003" variation in the separation of the armature from the core or pole piece.

Another object of my invention is to provide a relay having the above specified characteristics without being sensitive to shock and vibration.

Another object is to provide a relay of the type described that will be insensitive to sudden variations in the momentum and direction of movement of the craft in which it is being carried.

Another object of my invention is the provision of a small relay of the type hereinbefore described which will be sufficiently simple in construction to permit a low sale price.

A further object of my invention is to provide a construction that is not confined to single pole relays having the characteristics hereinbefore enumerated, but which will permit the construction of two and three pole relays having such characteristics.

Subsidiary objects that help to make possible the construction of relays having the foregoing enumerated characteristics include: the provision of means for connecting the switch terminals to the conductor leads on the header without requiring the use of solder except for electrical conductivity; the provision of means whereby the connections between the header and the relay terminals are automatically made by the proper positioning of the header and the miniature "Microswitch" or similar device that may be one of the components of one of the embodiments of my invention.

A further object of my invention is the provision of simple means in a device of the class described for limiting the travel of the armature away from the core of the electro-magnet.

Still another object is the provision of simple means for adjusting the tension of the spring that holds the armature away from the pole pieces so that only enough force is exerted by this spring to snap the control spring of the "Microswitch" or other equivalent switching device to its operated position.

Still other objects will appear as the specification proceeds.

In the drawings:

Fig. 9 is a perspective view, partly broken away, of another embodiment of my invention, showing an alterative arrangement for pivoting or mounting the armature.

Fig. 10 is a perspective view, with certain parts broken away, illustrating still another arrangement for pivoting or mounting the armature.

Fig. 11 is a partial section taken on line 11—11 of Fig. 10.

Fig. 12 is a broken-away sectional view through the armature and a portion of the lower channel of still another embodiment of my device, showing yet another means for mounting and pivoting the armature.

Fig. 13 is a cross section, partly broken away, showing a supporting means for the upper channel of my device, which said supporting means avoids the necessity of having the upper channel rest upon the coil or a central sleeve therein.

Fig. 14 is another section, similar to that of Fig. 13, showing an alternative means for providing a rest or abutment for the upper channel.

Fig. 15 illustrates yet another abutting arrangement on the lower channel for properly positioning the upper channel.

Fig. 16 illustrates another alternative to the methods illustrated in Figs. 5 and 8 for limiting the travel of the armature.

Figure 2:
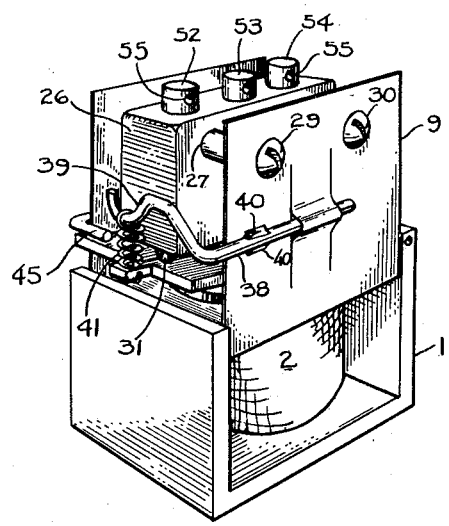
Fig. 2 is a perspective view of my relay completely assembled excepting for the header.

In the embodiment of my invention that I prefer at present, I provide a channel-shaped member 1 formed of material having low magnetic retentivity. A coil of magnet wire 2 nests within the channel-shaped member 1. A second channel-shaped member 9 is disposed over the coil 2 with its base portion 10 resting between the ends 11 and 12 of the side members of the first described channel-shaped member 1. Member 9 has an aperture 13 in its base 10. When the channel member 9 is placed in proper position for assembly, the aperture 13, the hole 5 in the coil 2 and the aperture 7 in the base of member 1 are in longitudinal alignment. The shank of the pin or pole piece 3 extends through aperture 13 and hole 5 in the coil and rests against the base of member 1. The core or pole piece 3 has a threaded hole in its lower end which during assembly is aligned with aperture 7. A screw 8 extends through hole 7 and is threaded into hole 6, thus bringing the flange 4 into firm engagement with the upper surface of the base 10 of the channel-shaped member 9, serving to clamp this base and the coil between flange 4 and the base of member 7. The pole piece thus holds the two channels together with the coil of my relay between them.

Alternative means may of course be used for holding the channels, pole piece and core together—such, for example, as a reduced end on the core piece suitably threaded to cooperate with threads that may be provided in the hole 7, or with an external nut; or these parts may be riveted together.

Figure 1:
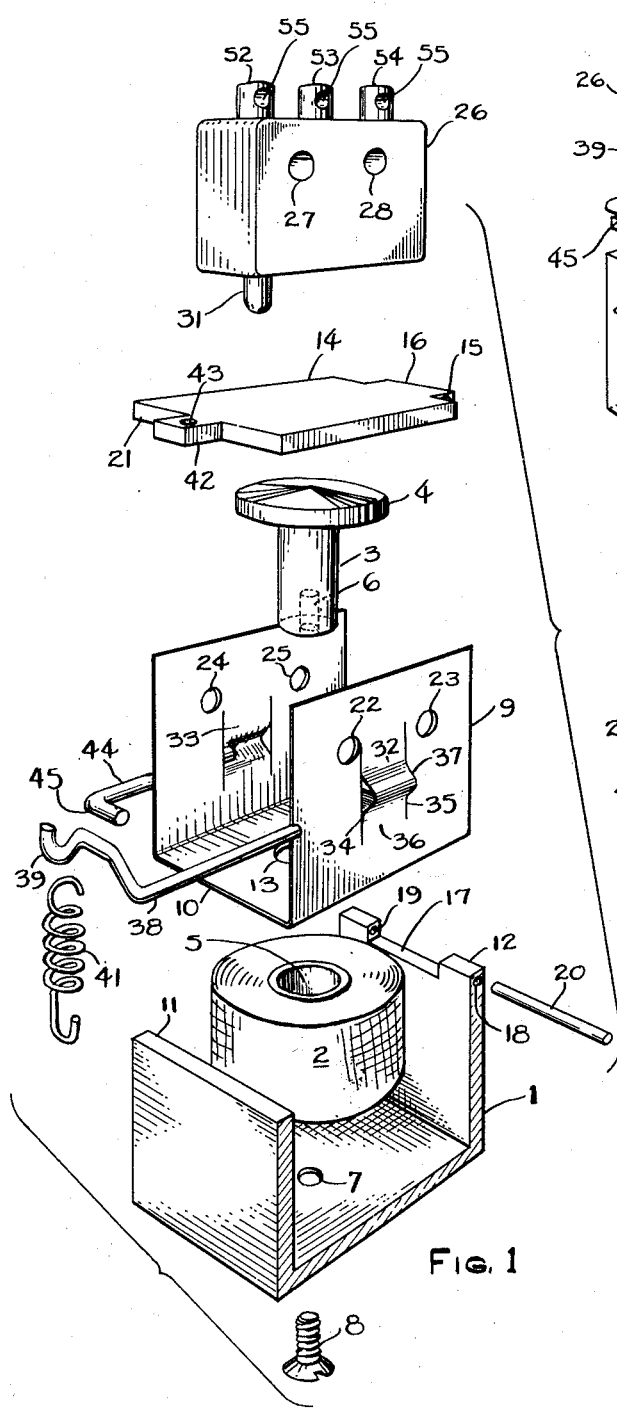
Fig. 1 is an exploded view of most of the parts forming the preferred embodiment of my invention.

The armature 14 is provided with a bearing or pivot hole 15 in a reduced end 16 thereof. Reduced end 16 is received in a recess 17 in one of the side walls of member 1. The portions of this side wall on opposite sides of the recess 17 are provided with longitudinally aligned holes 18 and 19, as shown in Fig. 1. The hole 15 in the reduced end 16 of the armature is aligned during assembly with holes 18 and 19 in order to receive the pivot pin 20 which pivotally mounts the armature. The opposite side wall is of such height that when end 21 of the armature is in contact therewith, there is a slight gap between the armature and the upper end of the pole piece 3. The armature 14, of course, is formed of material having low magnetic retentivity; and it will be observed that the channel 1, the armature 14 and the core 3 together form a pair of inter-linked, closed, magnetic circuits.

The upper channel 9 is provided with four holes, 22, 23, 24 and 25 for mounting one or more switches 26 having the general construction of a miniature "Microswitch." In my presently preferred embodiment, I use the miniature "Microswitch" model number V3. This switch is provided by the manufacturer with two mounting holes 27 and 28 extending therethrough. Screw 29 extends through hole 22 in the upper channel-shaped member 9 and thence through hole 27 in the "Microswitch" and finally through hole 24 in the opposite side of the channel-shaped member 9. Screw 30 likewise extends through holes 23, 28 and 25. Nuts may be threaded on the free ends of these screws for holding the screws for the switch 26 in place. If desired, pins or rivets may of course be used in lieu of the screws 29 and 30.

When the components heretofore mentioned are assembled in the manner described, the operating pin 31 of the "Microswitch" 26 is engageable by the upper surface of the armature 14; in fact, the usual practice is for the pin and armature to remain in engagement in all positions of the armature.

The channel-shaped member 9 is provided with two integrally formed clips 32 and 33 on opposite sides thereto. Clip 32 is formed by lancing two parallel slots 34 and 35 and a connecting slot 36 in one side of member 9 and then crimping the intervening material as shown at 37. Clip 33 on the opposite side of channel 9 is formed in the same manner.

Figure 5:
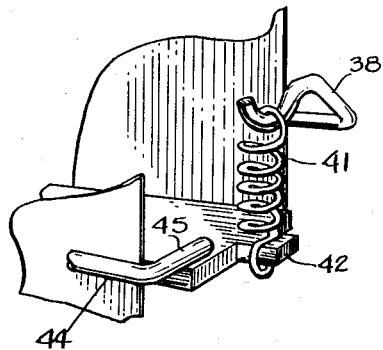
Fig. 5 is a broken-away view of the armature of my relay together with the keeper spring, the spring support, and the member that limits the travel of the armature in response to the action of said spring.

Clip 32 receives a member 38, Figs. 1, 2 and 5, which is formed of wire or a thin rod. The straight end of this wire or rod is gripped between the clip 37 and the adjoining outer wall of channel 9. This rod is bent so that it extends along one open side of the channel 9 and terminates in a hook 39. The wire or rod 38 is constrained against turning by any suitable means such as by the solder fillets 40 indicated in Fig. 2. An expansion spring 41 is fastened to the free end 42 of armature 14 by means of the aperture 43 therein, and the opposite end of the spring is fastened to the hook 39 on the outer end of the wire or rod 38, which thus forms a support for one end of the spring.

A second wire or rod member 44 is formed into a generally L-shaped configuration as shown in Figs. 1 and 5. One end of this pin or rod is gripped between the clip 33 and the adjoining outer wall of the side member of which this clip is an integral part. Rod 44 may be constrained against rotation in the same manner employed for preventing the rotation of rod 38. The outer end 45 serves as a limiting stop for armature 14. It is adjusted by bending so that the armature will move only far enough away from the top of the pole piece 3 to cause the pin 31 of the "Microswitch" to actuate the said switch. It is important in a relay that is to operate such a switch by means of a faint current in its coil to reduce the movement of the armature 14 to a minimum, and this, of course, is done by a proper factory adjustment of the end 45 of the L-shaped rod 44.

As is well known in the art, switches of the "Microswitch" type are spring loaded by their main leaf spring in order to hold one pair of contacts closed and to push the actuating pin to its outermost position. In the construction of my relay, the tension of spring 41 is adjusted so that only enough tension is supplied by this spring to raise the armature 14 against gravity and the force exerted by the contact spring of the switch.

Figure 3:
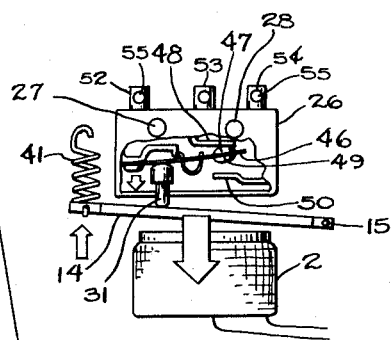
Fig. 3 is a partly schematic diagram of my relay showing the cooperation of its armature with the cooperating parts of a miniature "microswitch."

In Fig. 3, a small "Microswitch" is shown cut away in order to disclose the principal operating parts thereof. The main spring is identified by the number 46. This spring pushes the pin 31 in the direction indicated by the small arrow at its left. When the tension of spring 41 has been adjusted by properly bending the wire 38, the armature 14 will hold the pin 31 and the spring 46 in the position shown in Fig. 3. The moving contact 47 will then engage the stationary contact 48. When the coil 2 is energized, the inherent tension of spring 46 and the magnetic pull on the armature 14 will overcome the force of spring 41 and move the armature 14 toward the hole piece 3, thus permitting contact 49 of the "Microswitch" to move into engagement with the stationary contact 50.

Switches of the "Microswitch" type are provided with a leaf spring or springs to cause the main spring 46 to snap toward one or other of the opposite stationary contacts. The leaf spring or springs that effect such operation may be integral with the main spring, such as 46, or separate therefrom. An independent actuating spring 51 is shown in Fig. 3.

With the cooperation above described between the parts of switch 26 and the armature 14, contacts 47 and 48 are closed when no current flows in coil 2, and contact 49 comes into engagement with the stationary contact 50 when coil 2 is energized.

Figure 6:
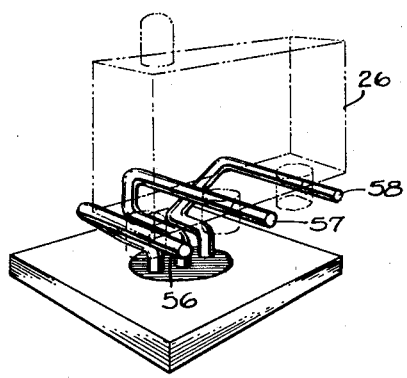
Fig. 6 shows the cooperation between the terminals of a current model of "microswitch" and the specially formed leads provided on the header of my device.

"Microswitches" of the type shown in the drawings accompanying this specification are provided with terminals 52, 53 and 54. These terminal posts have apertures 55 therein. In order to facilitate the electrical connection between the terminals on the header of my relay, I provide the insulating header with three spaced wire members 56, 57 and 58, as shown in Fig. 6. These are so formed that their ends may be inserted through the holes 55 in the terminal posts 52, 53 and 54 of the "Microswitches."

Figure 7:
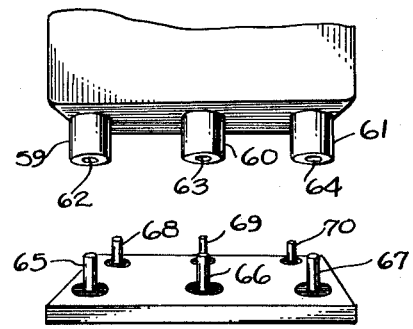
Fig. 7 illustrates the cooperation between the terminals of such switch and a modified form of leader suitable for use where my invention is used to control the operation of a double pole switch.

An alternative arrangement for connecting the terminals of the header with the terminals of the "Microswitch" is shown in Fig. 7. The terminals 59, 60 and 61 of the "Microswitch" are here shown with holes 62, 63 and 64 extending inward from the outer ends thereof. The header is provided with insulated and parallel terminals 65, 66 and 67 for insertion respectively into holes 62, 63 and 64.

As set forth in the objects, my invention contemplates the use not only of one "Microswitch" but of a plurality thereof. When more than one "Microswitch" is used, connections may be formed between the terminals and the header and the terminals of the "Microswitch" in the manner illustrated generally in Fig. 7, where three additional header terminal conductors 68, 69 and 70 are indicated for cooperation with a second "Microswitch."

The structure hereinbefore described makes possible a relay that will open and close circuits carrying from 500 to 1,000 watts when energized by a current as low as 20 milli-watts. The cooperation of the spring 41 and the armature 14 with the component parts of the "Microswitch" permit the "Microswitch" to be operated by a very small current, and the freedom of the moving parts from natural periods of vibration permit operation at speeds heretofore difficult to attain in mechanical relays.

The lower channel 1 and the core 3 may be formed of any magnetic material in which the magnetic lines of force will rapidly expand and collapse. It is, of course, not essential that this channel be made of ferrous material if suitable other materials become available having the required magnetic properties. It is desirable that the upper channel 9 be formed of non-magnetic material, such as brass or a suitable plastic. My invention, however, is not confined to combinations in which the components are formed of any specific material.

Figure 8:
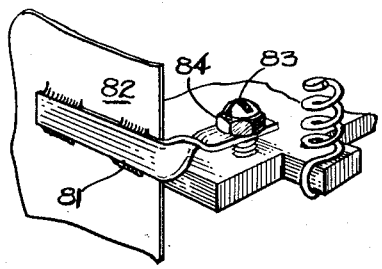
Fig. 8 is a broken-away view of my relay showing an alternative arrangement for limiting the movement of its armature.

The means illustrated in Fig. 5, and hereinbefore described, for limiting the upward movement of the armature may be replaced by the means shown in Fig. 8 or in Fig. 16. In Fig. 8, strap 81 is attached to the side 82 of the upper channel, and it is bent as shown in the figure to form a support for the adjustable screw 83. The free end of strap 81 has an aperture therein which is threaded to receive the screw 83. When this screw is adjusted for limiting the upward movement of the armature at the desired point, the lock nut 84 is tightened in place.

In the arrangement shown in Fig. 16 for limiting the travel of the armature 14a, the side 11a of the lower chanel is cut away at the top in the manner illustrated. The free end 42 of the armature extends into the recess 97, which is sufficiently larger than the cross section of the free end 42 to permit the armature to move up and down without engaging the sides of the recess. The overhanging portions 98 and 99 of the side or end piece 11a extend over the upper end 42 of the armature. These overhanging portions may be bent up or down to limit the travel of the armature 42 in much the same way that the end of wire 42, shown in Figs. 1, 2 and 5, is bent in order to limit the armature's travel.

Figures 9, 10 and 11 illustrate alternative means for pivoting the armature. In these arrangements, no pivot pin is used. In the embodiment shown in Fig. 9, two springs 85 and 86, each having a generally C-shaped configuration, are each anchored at their opposite ends in appropriate holes in the armature. The portion of the upper edge of the end piece 12 of the lower channel that lies between the upwardly extending portions 87 and 88 acts as a fulcrum for the armature, and springs 85 and 86 hold the armature in engagement with this fulcrum.

The two springs 85 and 86 may be replaced by a leaf spring 89, as shown in Figs. 10 and 11. The edge of the upper end of spring 89 rests in groove 90, cut in the armature. A similar groove, not shown in the figures, is provided in the lower end of the channel 1 for receiving and positioning the lower end of spring 89.

Figure 4:
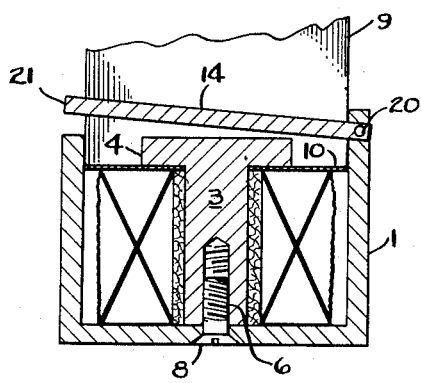
Fig. 4 is a cross section through the core and armature of my relay, together with a portion of the base of the member that supports the "microswitch" or equivalent switching device.

If closer magnetic coupling is desired between the free end of the armature and the adjoining end of channel 1 than is possible with the arrangement illustrated in Figs. 2 and 4, such coupling may be provided by notching a recess 91 in the channel so that the reduced end 42 of the armature may be received therein. With this arrangement, the free end of the armature is closely coupled magnetically with the associated end of the channel 1 in all operative positions of the armature.

A knife edged fulcrum may be provided on end 12 of the lower channel 1, as is indicated in Fig. 12. This edge may rest in a groove 92 on the under side of the armature.

Figs. 13, 14 and 15 respectively illustrate three different alternative means for providing abutments on the lower channel 1 for the upper channel 9.

In Fig. 13, the inner surfaces of the upper ends of the lower channel 1 are milled out as shown at 93 to form shoulders or ledges 94 upon which the upper channel 9 may rest.

In Fig. 14, abutments 95 are provided on the inner surfaces of the lower channel, near the upper ends, by embossing or staking.

Another method of forming stops or rests on the lower channel 1 for the upper channel 9 is illustrated in Fig. 15, where ears 96 are indicated as being formed by shearing and bending the upper edges of the lower channel.

The function of the upper channel is, of course, to mount one or more switches 26. In order to serve this end, it is not essential that member 9 be of a U-shaped or channel formation. An L-shaped bracket may be used for this purpose, and one or more "Microswitches," or their equivalents, may be suitably bolted or fastened to a single upright side.

The figures hereinbefore described show only illustrative embodiments of my invention, and various substitutions, omissions and additions may be made from any embodiment thereof without departing from its broad spirit as set forth in the appended claims.

My claims are:

1. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is in contact with said armature at least in the operated position of said switch and a spring attached to said armature for holding said button in the operated position when said coil is not energized.

2. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring attached to said armature for holding said button in the operated position when said coil is not energized; and means for limiting the movement of said armature away from said flange.

3. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring support on said second member; an expansion spring attached to said support and to the free end of said armature for holding said button in the operated position when said coil is not energized; and means for limiting the movement of said armature away from said flange.

4. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring support on said second member; an expansion spring attached to said support and to the free end of said armature for holding said button in the operated position when said coil is not energized; and adjustable means on said second member for limiting the movement of said armature under action of said spring.

5. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring support of pliable metal on said second member; and an expansion spring attached to said support and to the free end of said armature for holding said button in the operated position when said coil is not energized, said spring being adjusted by bending its support so that it exerts a minimum of force on said armature beyond that required to snap the spring of said "Microswitch" type switch to its operated position.

6. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring support of pliable metal on said second member; an expansion spring attached to said support and to the free end of said armature, said spring being adjusted by bending its support so that it exerts a minimum of force on said armature beyond that required to snap the control spring of said switch to its operated position; and means for limiting the movement of said armature under action of said expansion spring.

7. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring support of pliable metal on said second member; an expansion spring attached to said support and to the free end of said armature, said spring being adjusted by bending its support so that it exerts a minimum of force on said armature beyond that required to snap the spring of said switch to its operated position; and a pliable abutting element on said second member for adjustably limiting the movement of said armature under action of said expansion spring to a minimum distance after the spring of said switch has snapped to said operated position.

8. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; said second member having a plurality of spaced slots in a side wall thereof, the material between said slots being pressed outwardly to form a strip displaced from said side wall; a spring support comprising an elongated pliable metal element extending between said strip and side wall and gripped therebetween; and an expansion spring attached to said support and to the free end of said armature for holding said button in the operated position when said coil is not energized.

9. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring support on said second member; an expansion spring attached to said support and to the free end of said armature for holding said button in the operated position when said coil is not energized; said second member having a plurality of spaced slots in a side wall thereof, the material between said slots being pressed outwardly to form a strip displaced from said side wall; and an abutment for limiting the movement of said armature away from said flange, said abutment comprising an elongated pliable metal element extending between said strip and side wall and gripped therebetween.

10. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; said second member having a first pair of spaced slots in a first side wall thereof, the material between said first pair of slots being pressed outwardly to form a first strip displaced from said first side wall; a spring support comprising an elongated pliable metal element extending between said strip and said first side wall and gripped therebetween; an expansion spring attached to said support and to the free end of said armature for holding said button in the operated position when said coil is not energized; said second member also having a second pair of spaced slots in a second side wall thereof, the material between said second pair of slots being pressed outwardly to form a second strip displaced from said second side wall; and an abutment for limiting the movement of said armature away from said flange, said abutment comprising an elongated pliable metal element extending between said second strip and said second side wall and gripped therebetween.

11. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring attached to said armature for holding said button in the operated position when said coil is not energized; and means for adjustably limiting the travel of the free end of said armature.

12. In a relay, a first channel-shaped member having low magnetic retentivity; a multi-layer coil of magnet wire disposed in said channel-shaped member; a second channel-shaped member of non-magnetic material having an aperture in its base, said second member so positioned that its base is interposed between the outer ends of the walls of said first channel-shaped member; a pin of low magnetic retentivity having a flange on one end, said pin extending through the aperture in the base of said second member and through said coil; means for attaching the non-flanged end of said pin to the base of said first member to clamp the base of said second member and said coil between said flange and the base of said first member; a substantially flat armature pivoted to the outer end of one wall of said first channel-shaped member and overlapping the outer end of its other wall, said armature overlying and spaced from said flange; a switch of the "Microswitch" type mounted within said second member, said switch so disposed that its operating button is contactable by said armature; a spring attached to said armature for holding said button in the operated position when said coil is not energized; and means for adjustably limiting the travel of the free end of said armature; said means comprising a sub-bracket attached to said non-magnetic bracket, said sub-bracket having a threaded hole therein, and a screw in threaded engagement with said threaded hole, said screw so disposed that it engages the outer surface of said armature near its free end.

References Cited in the file of this patent
UNITED STATES PATENTS
255,378    Connolly _____ Mar. 21, 1882

(Other references on following page)

UNITED STATES PATENTS

| | | |
|---|---|---|
| 429,377 | English | June 3, 1890 |
| 1,219,008 | Kennington | Mar. 13, 1917 |
| 1,845,992 | Wise | Feb. 16, 1932 |
| 2,339,610 | Baker | Jan. 18, 1944 |
| 2,384,287 | Drury | Sept. 4, 1945 |
| 2,423,116 | Price | July 1, 1947 |
| 2,438,745 | Fox | Mar. 30, 1948 |
| 2,463,333 | Van Valkenburg | Mar. 1, 1949 |
| 2,623,964 | Fischler | Dec. 30, 1952 |
| 2,707,774 | Keller | May 3, 1955 |